United States Patent [19]

Cook et al.

[11] 4,158,604

[45] * Jun. 19, 1979

[54] BOILER SYSTEMS FOR NUCLEAR POWERED REACTORS

[75] Inventors: Reginald K. Cook, Kibworth Harcourt; Brian V. George, Willoughby Waterleys, both of England

[73] Assignee: Nuclear Power Company (Whetstone) Limited, Leicestershire, England

[*] Notice: The portion of the term of this patent subsequent to Mar. 19, 1994, has been disclaimed.

[21] Appl. No.: 496,285

[22] Filed: Aug. 7, 1974

Related U.S. Application Data

[63] Continuation of Ser. No. 178,525, Aug. 30, 1971, abandoned.

[51] Int. Cl.² ............................................. G21C 15/02
[52] U.S. Cl. .................................. 176/60; 176/38; 176/65; 60/644; 60/705
[58] Field of Search .................. 176/37, 38, 60, 65, 176/87, 38; 60/42, 102

Primary Examiner—Stephen C. Bentley
Assistant Examiner—Peter A. Nelson

[57] ABSTRACT

Power generating plant which comprises a heat source, at least one main steam turbine and at least one main boiler heated by heat from the heat source and providing the steam to drive the turbine, comprises additionally at least one further steam turbine, smaller than the main turbine, and at least one further boiler, of lower capacity than the main boiler, and heated from the same heat source and providing steam for the further turbine.

Particularly advantageous in nuclear power stations, where the heat source is a nuclear reactor, the invention enables peak loads, above the normal continuous rating of the main generators driven by the main turbines, to be met by the further turbine(s) and one or more further generators driven thereby. This enables the main turbines to be freed from the thermal stresses of rapid load changes, which stresses are more easily accommodated by the smaller and thus more tolerant further turbine(s). Thus auxiliary diesel-driven or other independent power plant may be made partly or wholly unnecessary. Further, low-load running which would be inefficient if achieved by means of the main turbine(s), can be more efficiently effected by shutting them down and using the smaller further turbine(s) instead. These latter may also be used to provide independent power for servicing the generating plant during normal operation or during emergency or other shutdown, and in this latter case may also serve as a heat sink for the shutdown reactor.

5 Claims, 4 Drawing Figures

BOILER SYSTEMS FOR NUCLEAR POWERED REACTORS

This application is a continuation application of Ser. No. 178,525 of Cook, et al., filed Aug. 30, 1971 and now abandoned.

This invention relates to power generating plant and has especial application to boiler systems for nuclear power stations.

In order to cope with peak demands for electricity there is an increasing requirement for a power station having auxiliary generating capacity over and above the normal maximum continuous rating of the station. Such auxiliary capacity can be provided by gas turbine or diesel engine powered plant, but it would be convenient to associate at least some auxiliary generating plant with the heat source already present in the station.

Further, where only large steam turbines are employed in a power station a degree of inflexibility in accommodating rapid changes in electricity demand exists because such turbines suffer considerable thermal stresses if subjected to rapid load changes. A further disadvantage lies in the fact that steam turbines are inefficient at low load so that it is undesirable to run a large steam turbine at low load in order to meet a considerably reduced demand for electricity.

Finally, with some nuclear reactors, and in particular with the so-called High Temperature Reactor, it is desirable that the predominant flow of reactor coolant through the reactor core be downward. To simplify the reactor coolant circuit it is therefore convenient to pass the reactor coolant upwardly through associated boilers and so, in order to achieve counterflow within the boiler, water and steam must flow downwardly through the boiler. Owing to waterside instability such water downflow boilers could be difficult to operate at low flow rates which may be occasioned either by low load running of a large steam turbine to which they are connected, or by emergency use of such boilers as a heat sink for the reactor core.

According to the invention there is provided power generating plant comprising a heat source, at least one main boiler arranged to be heated by heat from the heat source, and at least one main steam turbine arranged to be driven by steam generated in the said main boiler, wherein there is further provided at least one further boiler, of lower capacity than the said main boiler and also arranged to be heated by heat from the heat source, and at least one further steam turbine of lower capacity than the main steam turbine and arranged to be driven by steam generated in the said further boiler.

Where the boiler system is used to supply steam to turbines which are each connected to a generator, the said further or auxiliary boiler(s) may be operated to enable the said further or auxiliary turbine(s) and generator(s) to provide auxiliary generating capacity over and above the normal maximum continuous rating of the main turbine and generator. Further, whilst the main boiler(s) are being operated to enable the main turbine to run under substantially constant load, the auxiliary boiler(s) may be operated to enable the auxiliary turbine(s), being smaller and thus more tolerant of rapid load changes, to run under varying load in order to accommodate changes in demand for electricity.

The common heat source may advantageously be the core of a nuclear reactor, the boilers being disposed in a heat exchange circuit including the core such that reactor coolant fluid can flow through the core to abstract heat therefrom, and then through the boilers in which the heat is used to generate steam. Conveniently each boiler is disposed in a vertical channel or 'pod' defined within the wall thickness of the reactor pressure vessel. To avoid operating the main boiler(s) at low flowrate when supporting a very considerably reduced load, it is possible to shut the main boiler(s) and turbine down and carry the load solely on the auxiliary boiler(s) and turbine(s). Thus the problem, mentioned above, of instability in a main boiler operating at low flowrate can be avoided since, in supporting the same load, the auxiliary boiler(s), being of smaller size, will operate at a considerably higher flowrate. Further, because of the smaller size of the auxiliary boiler(s), it is comparatively easy to arrange the heat exchange circuit such that reactor coolant flows downwardly through the auxiliary boiler(s), so enabling water flow therein to be upward.

In order to maintain essential services in a power station during an emergency involving loss of normal power supplies, it is usual to provide emergency generating facilities. Such facilities are usually completely idle during normal running of the station. However, where a boiler system in accordance with the invention is associated with a nuclear heat source it becomes possible to dispense with at least part of the emergency generating facilities since, after emergency or even normal shut-down of the reactor core and the main boiler(s), the auxiliary boiler(s) can be operated to enable the auxiliary turbine(s) and generator(s) to run under at least part load. The auxiliary boiler(s) can continue operating in this manner for some considerable time simply by abstracting residual heat from the reactor core. This operating time can be maximised by designing the auxiliary boilers to produce steam at an appreciably lower temperature and pressure than the main boilers. To enable such continued operation of the auxiliary boiler(s) to occur a water feed and condensing system separate from that for the main boiler(s) is provided. It will be appreciated that a further advantage accrues from the use in such circumstances of a boiler system in accordance with the invention, in that, after shut-down of the reactor core, the core is effectively cooled by the auxiliary boiler(s) which act(s) as a core heat sink. The auxiliary boiler(s) can also be used for power generation during reactor and main boiler start-up.

One embodiment of the invention will now be decribed with reference to the accompanying drawings of which:

Figure 1:
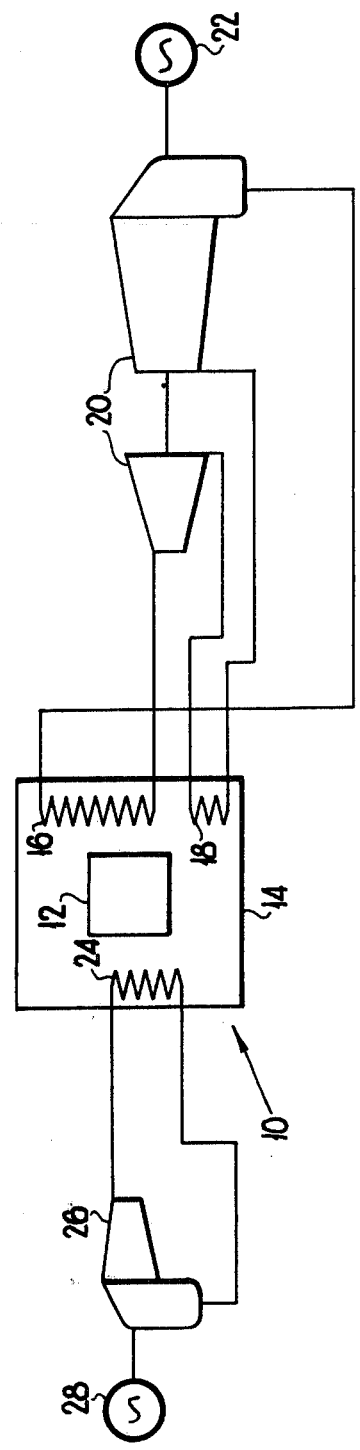
FIG. 1 is a diagrammatic representation of a boiler system in accordance with the invention, together with associated plant, applied to a helium cooled high temperature nuclear reactor.

Referring to FIG. 1, there is shown the reactor 10 having a helium cooled core 12 disposed within a concrete pressure vessel 14. Also disposed within the concrete pressure vessel are four main boilers 16 (of which only one is shown in FIG. 1) each main boiler 16 having a reheater 18 associated therewith. The main boilers 16 and associated reheaters 18 are connected to a large multi-cylinder steam turbine, generally referenced 20, arranged to drive a 666 MW alternator 22.

Four auxiliary boilers 24 (again only one of which is shown in FIG. 1) are also disposed within the pressure vessel 14 and are connected to two auxiliary steam turbines 26 (of which only one is shown) each arranged to drive a 60 MW alternator 28.

Figure 2:
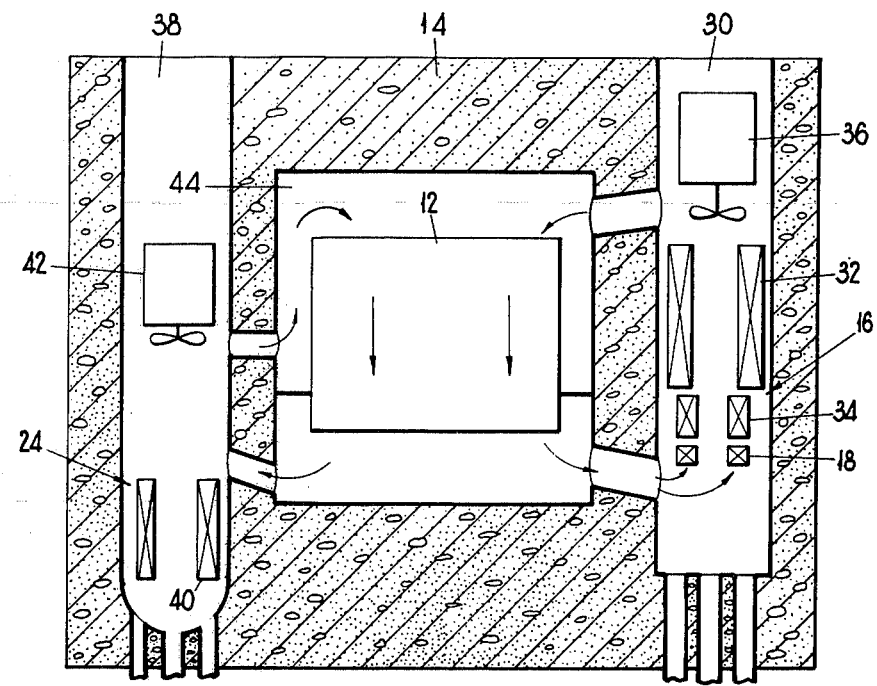
FIG. 2 is a sectional elevation of the reactor shown in FIG. 1.

Referring to FIG. 2 there is agin shown one main boiler 16 and one auxiliary boiler 24. Each main boiler 16 is disposed within a vertical cylindrical channel or pod 50 defined within the wall thickness of the pressure vessel 14. The main boiler 16 comprises an economizer and evaporator section 32 and a super-heater section 34. The reheater 18 is disposed below the super-heater section 34. Above the main boiler 16 is a reactor coolant circulating pump 36 arranged to draw helium coolant upwardly through the boiler from the bottom of the core 12. The auxiliary boiler 24 is disposed in a pod 38 similarly defined in the wall thickness of the pressure vessel 14, the boiler comprising economizer, evaporator and superheater water/steam tube sections generally referenced 40. Disposed above the auxiliary boiler 24 is a reactor coolant circulating pump 42 arranged to draw reactor coolant downwardly (as explained below the reference to FIG. 4) through the tube sections 40 from the bottom of the core 12. Both the coolant pump 36 and the coolant pump 42 are arranged to discharge cool coolant into a plenum space 44 above the core 12. Thus coolant flow through the core 12 occurs downwardly and refuelling, control rod and other apparatus penetrating the top of the pressure vessel 14 is exposed only to reactor coolant at the lowest circuit temperature.

Figure 3:
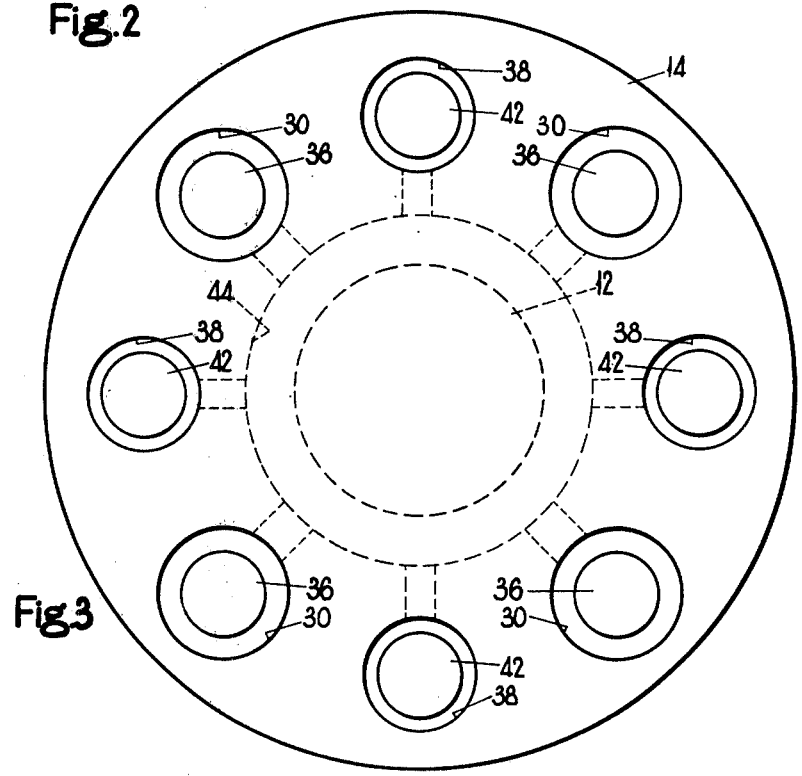
FIG. 3 is a plan view, of the reactor shown in FIGS. 1 and 2.

Referring to FIG. 3 it will be seen that there are four pods 30 and four pods 38 disposed alternately around the core 12. It will be noticed that the pods 38 which house the auxiliary boilers are smaller in diameter than the pods 30 which house the main boilers.

Figure 4:
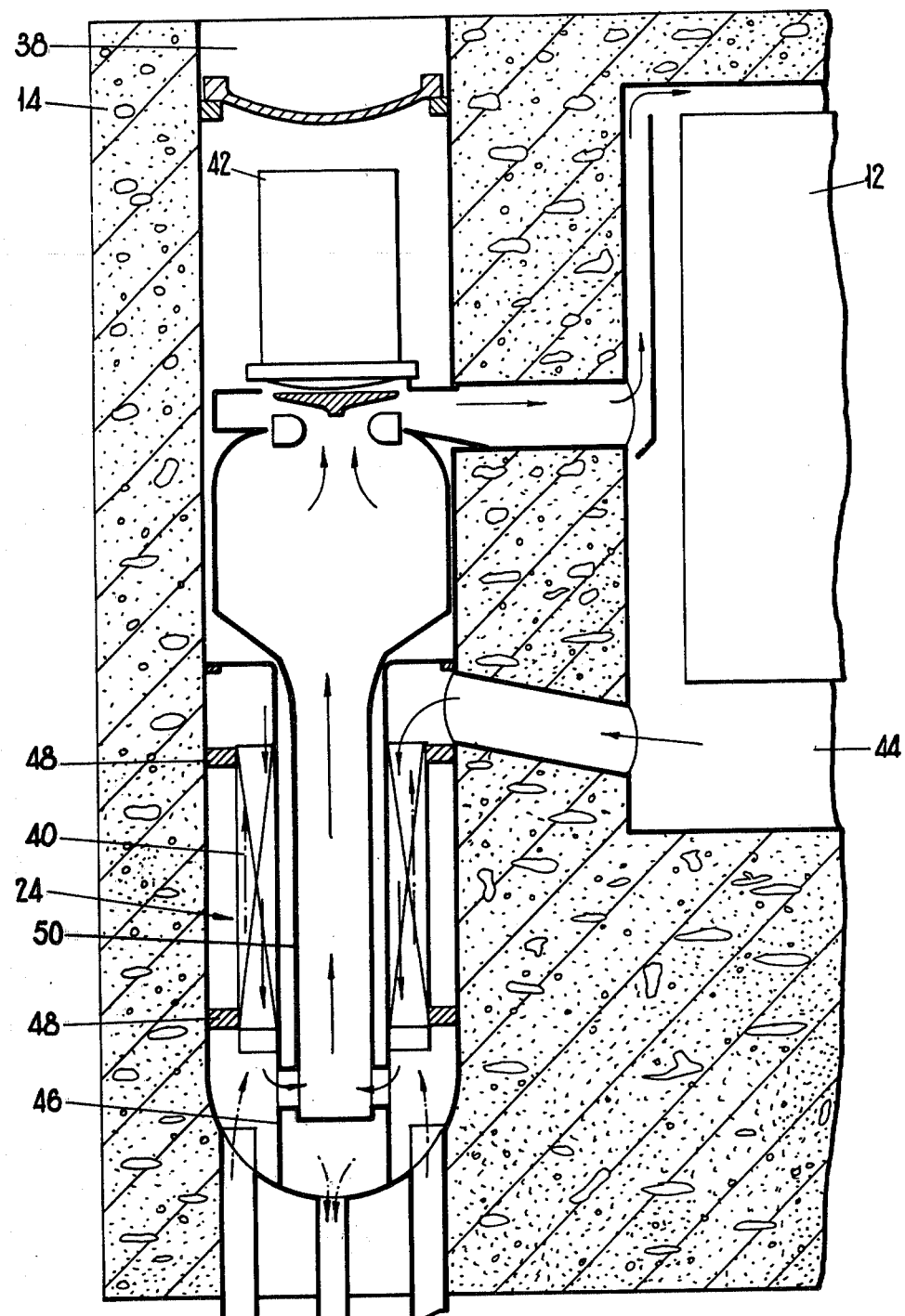
FIG. 4 is a fragmental sectional elevation, to an enlarged scale compared with FIG. 2, and showing in greater detail part of the left-hand thereof.

Referring to FIG. 4, in which one auxiliary boiler 24 is shown in greater detail, it will be seen that the tube sections constitute a generally annular formation supported at its inner periphery by a support spine 46 extending from the floor of the pod 38 and at two axially spaced points on its outer periphery by annular structures 48 which are attached to the pod walls. Within the support spine 46 is a coolant duct 50 having a closed lower end and whose upper end communicates with the coolant circulator 42. In operation of the auxiliary boiler reactor coolant flows from the bottom of the core 12, into the pod 38, down through the tube sections 40, radially inwardly into the bottom of the duct 50, and upwardly through the duct 50 to pass through the circulator 42 to the plenum 44. Water is fed from below the pressure vessel 14 through feed tail pipes (not shown) to the lower end of the tube sections 40 and steam passes from the upper end thereof downwardly via superheater tail pipes between the support spine 46 and the duct 50 and out through the bottom of the pressure vessel 14. Thus the direction of water flow through the tube sections 40 is upward and so the auxiliary boiler will remain stable even when operated at relatively low water flowrates.

With all three turbines 20, 26 and alternators 22, 28 in operation a useful load of approximately 750 MW can be supported, the difference between this output and the installed capacity of 786 MW (666+60+60) being consumed by various internal power station services. The thermal output capacity of the reactor core 12 is suitably uprated to provide for such an output. Alternatively the main turbine can be run alone to support a load of up to 666 MW. Where the electricity demand on the reactor varies over a total range of rather less than 120 MW, the main boilers and turbine can be operated under constant load, and the auxiliary boilers and one or both of the auxiliary turbines can be operated under varying load, thus avoiding the subjection of the large main turbine to thermal stresses caused by rapid load changes.

After emergency or normal shut-down of the core 12 and the main boilers and turbine it is possible to maintain operation of the auxiliary boilers and turbine in order to support at least some essential services necessary for the reactor and associated plant. The auxiliary boilers can operate in this manner by abstracting residual heat from the reactor core, and thus serve an additional purpose in acting as a core heat sink. Whereas the steam conditions at outlet from each main boiler superheater section 34 are 2350 p.s.i.a. at 1000° F. and from each reheater 18 600 p.s.i.a. at 1000° F., the corresponding conditions at outlet from each auxiliary boiler 24 are 915 p.s.i.a. at 900° F. Thus the length of time over which the auxiliary boilers can be run on residual core heat is considerable and it is possible to make a worthwhile capital financial saving by reducing the amount of normally idle emergency generating plant provided for the reactor. The auxiliary boilers can also be operated at an early stage in reactor start-up in order to support at least some essential reactor services.

We claim:

1. Power generating plant comprising: a gas-cooled nuclear reactor having a reactor core, a concrete pressure vessel housing the core and defining above and below the core, respectively, an upper and a lower coolant-gas plenum space, the pressure vessel having a vertical wall surrounding the core and having formed in said wall a plurality of vertically extending first cavities and a plurality of vertically extending second cavities; a plurality of main steam turbines each having a high pressure stage and a lower-pressure stage; a plurality of further steam turbines, each of lower capacity than any of said main steam turbines; a respective first duct, in said wall, opening out of each said first cavity and connecting it to said upper plenum space; a respective second duct, in said wall, opening into said first cavity below said respective first duct and connecting said first cavity to said lower plenum space;

a respective third duct, in said wall, opening out of each said second cavity and connecting it to said upper plenum space;

a respective fourth duct, in said wall, opening into each said second cavity below said respective third duct and connecting said second cavity to said lower plenum space;

within each said first cavity a respective main boiler and, thereabove, a respective main gas-circulating means arranged to draw coolant gas upwardly through said main boiler and to discharge such coolant gas through said respective first duct into said first plenum chamber, said respective main boiler having an upper economizer and evaporator section and, therebelow, a lower superheater section connected to supply steam to said high-pressure stage of a respective one of said main steam turbines; within each said first cavity, and below said respective main boiler therein, a respective steam reheater connected to receive steam from that main turbine high-pressure stage supplied by said respective main boiler and to supply said steam to the lower-pressure stage of that main turbine; and within each said second cavity, a respective further duct extending longitudinally thereof both above and below said respective fourth duct opening into said second cavity, a respective further gas circulating means arranged to draw coolant gas upwardly through said respective third duct into said first plenum chamber, and a respective further boiler disposed externally of said respective further duct above the lower end thereof and below said respective fourth duct opening into said respective second cavity, each said further boiler being of lower capacity than any of said main boilers and being connected to supply steam to a respective one of said further steam turbines.

2. Power generating plant comprising; a fluid-cooled nuclear reactor having a reactor core, a concrete pressure vessel housing the core and defining above and below, the core, respectively, an upper and a lower coolant-fluid plenum space, the pressure vessel having a vertical wall surrounding the core and having formed in said wall a plurality of vertically extending first cavities circumferentially distributed around said wall and a plurality of vertically extending second cavities also circumferentially spaced around said wall and alternating with said first cavities; a plurality of main steam turbines; a plurality of further steam turbines, each of lower capacity than any of said main steam turbines; a respective first duct in said wall, opening out of each said first cavity and connecting it to said upper plenum space; a respective second duct in said wall, opening into said first cavity and connecting said first cavity to said lower plenum space;

a respective third duct in said wall, opening out of each said second cavity and connecting it to said upper plenum space;

a respective fourth duct in said wall, opening into each said second cavity and connecting said second cavity to said lower plenum space;

within each said first cavity, a respective main boiler and a respective main fluid-circulating means arranged to draw coolant fluid through said main boiler and to discharge such coolant fluid through said respective first duct into said first plenum chamber, said respective main boiler being connected to supply steam to a respective one of said main steam turbines; and within each said second cavity, a respective further boiler and a respective further fluid-circulating means arranged to draw coolant fluid through said respective further boiler and to discharge such coolant fluid through said respective third duct into said first plenum chamber, each said further boiler being of lower capacity than any of said main boilers and being connected to supply steam to a respective one of said further steam turbines.

3. Power generating plant comprising; a fluid-cooled nuclear reactor having a reactor core, a concrete pressure vessel housing the core and defining above and below the core, respectively, an upper and a lower coolant-fluid plenum space, the pressure vessel having a vertical wall surrounding the core and having formed in said wall a plurality of vertically extending cavities; a main steam turbine having a high pressure stage and a lower-pressure stage; a further steam turbine, of lower capacity than said main steam turbine; a first duct, in said wall, opening out of a first of said cavities and connecting it to said upper plenum space; a second duct, in said wall, opening into said first cavity below said first duct and connecting said first cavity to said lower plenum space;

a third duct, in said wall, opening out of a second of said cavities and connecting said second cavity to said upper plenum space;

a fourth duct, in said wall, opening into said second cavity below said third duct and connecting said second cavity to said lower plenum space;

within said first cavity a main boiler and a main fluid-circulating means arranged to draw coolant fluid through said main boiler and to discharge such coolant fluid through said first duct into said first plenum chamber, said main boiler being connected to supply steam to said high-pressure stage of said main steam turbine; within said first cavity, and between said main boiler therein and said second duct, a steam reheater connected to receive steam from said main-turbine high-pressure stage and to supply said steam to the lower-pressure stage of said main turbine; and within said second cavity, a further boiler and a further fluid-circulating means arranged to draw coolant fluid through said further boiler and to discharge such coolant fluid through said third duct into said first plenum chamber, said further boiler being of lower capacity than said main boiler and being connected to supply steam to said further steam turbine.

4. Power generating plant comprising: a fluid-cooled nuclear reactor having a reactor core, a concrete pressure vessel housing the core and defining above and below the core, respectively, an upper and a lower coolant-fluid plenum space, the pressure vessel having a vertical wall surrounding the core and having formed in said wall a plurality of vertically extending cavities; a main steam turbine; a further steam turbine, of lower capacity than said main steam turbine; a first duct, in said wall, opening out of a first of said cavities and connecting it to said upper plenum space; a second duct, in said wall, opening into said first cavity below said first duct and connecting said first cavity to said lower plenum space;

a third duct, in said wall, opening out of a second of said cavities and connecting it to said upper plenum space;

a fourth duct, in said wall, opening into said second cavity below said third duct and connecting said second cavity to said lower plenum space;

within said first cavity a main boiler and a respective main fluid-circulating means arranged to draw coolant fluid upwardly through said main boiler and to discharge such coolant fluid through said first duct into said first plenum chamber, said main boiler having an upper economiser and evaporator section and, therebelow, a lower superheater section connected to supply steam to said main steam turbine; and within said second cavity, a further boiler and a further fluid-circulating means arranged to draw coolant fluid through said further boiler and to discharge such coolant fluid through said third duct into said first plenum chamber, said further boiler being of lower capacity than said main boiler and being connected to supply steam to said further steam turbine.

5. Power generating plant comprising: a fluid-cooled nuclear reactor having a reactor core, a concrete pressure vessel housing the core and defining above and